US007039015B1

(12) United States Patent
Vallone et al.

(10) Patent No.: US 7,039,015 B1
(45) Date of Patent: May 2, 2006

(54) SYSTEM AND METHOD FOR THE COLLECTION AND DISPLAY OF NETWORK PERFORMANCE DATA IN A COMMUNICATION NETWORK

(75) Inventors: Eric Vallone, Eatontown, NJ (US); Suzanne Hassell, Clearwater, FL (US); Michael McFarland, Clearwater, FL (US); David A. Johnson, Palm Harbor, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/293,009

(22) Filed: Apr. 16, 1999

Related U.S. Application Data

(60) Provisional application No. 60/083,035, filed on Apr. 24, 1998.

(51) Int. Cl.
*H04J 3/14* (2006.01)
(52) U.S. Cl. ..................... 370/252; 709/224
(58) Field of Classification Search ........ 370/252–254, 370/231–235, 230, 230.1; 709/223–229
See application file for complete search history.

(56) References Cited

U.S. PATENT DOCUMENTS

| 4,775,973 | A | * | 10/1988 | Tomberlin et al. .......... 370/253 |
| 5,600,632 | A | * | 2/1997 | Schulman ................... 370/252 |
| 5,654,966 | A | | 8/1997 | Lester, Jr. et al. .......... 370/392 |
| 5,867,483 | A | * | 2/1999 | Ennis, Jr. et al. .......... 370/252 |
| 5,883,819 | A | * | 3/1999 | Abu-Amara et al. ........ 365/578 |
| 5,974,237 | A | * | 10/1999 | Shurmer et al. ........ 395/200.54 |
| 5,974,457 | A | * | 10/1999 | Waclawsky et al. ........ 709/224 |
| 6,058,102 | A | * | 5/2000 | Drysdale et al. ............ 370/252 |
| 6,061,725 | A | * | 5/2000 | Schwaller et al. .......... 709/224 |
| 6,216,163 | B1 | * | 4/2001 | Bharali et al. .............. 709/227 |
| 2002/0018473 | A1 | | 2/2002 | Hassell et al. |

\* cited by examiner

*Primary Examiner*—Ricky Ngo
*Assistant Examiner*—Duc Duong
(74) *Attorney, Agent, or Firm*—Thomas, Kayden, Horstemeyer & Risley, LLP

(57) ABSTRACT

A data delivery analysis report is generated by collecting various network performance parameters from a plurality of communication devices connected to a communication network. Logic located at a network management system collects and presents the network performance information to a network administrator in a graphical format such that the network administrator may determine whether reduced network performance is attributable to the network or to the traffic characteristics of a particular network user.

36 Claims, 6 Drawing Sheets

SYSTEM AND METHOD FOR THE COLLECTION AND DISPLAY OF NETWORK PERFORMANCE DATA IN A COMMUNICATION NETWORK

CROSS REFERENCE TO RELATED APPLICATION

This document claims priority to and the benefit of the filing date of co-pending and commonly assigned provisional application entitled DATA DELIVERY ANALYSIS REPORT, assigned Ser. No. 60/083,035, and filed Apr. 24, 1998 and is hereby incorporated by reference.

TECHNICAL FIELD

The present invention relates generally to data communications, and more particularly, to a system and method for the collection and display of network performance data in a communication network.

BACKGROUND OF THE INVENTION

Historically, in the field of data communications, modems, data service units (DSU's), or channel service units (CSU's) have been used to convey information from one location to another. Digital technology now enables other communication devices, such as frame relay data service units (DSU's) and frame relay access units (FRAU's) to communicate large amounts of data at higher speeds. The communication scheme employed by these devices generally adheres to a model, known as the Open Systems Interconnect (OSI) Seven-Layer model. This model specifies the parameters and conditions under which information is formatted and transferred over a given communications network. A general background of the OSI seven-layer model follows.

In 1978, a framework of international standards for computer network architecture known as "OSI" (Open Systems Interconnect) was developed. The OSI reference model of network architecture consists of seven layers. From the lowest to the highest, the layers are: (1) the physical layer; (2) the datalink layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission, and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a modem connected to a PC).

Layer 2, the datalink layer, generally fragments the data to prepare it to be sent on the physical layer, receives acknowledgment frames, performs error checking, and re-transmits frames which have been incorrectly received.

Layer 3, the network layer, generally controls the routing of packets of data from the sender to the receiver via the datalink layer, and it is used by the transport layer. An example of the network layer is the Internet Protocol (IP), which is the network layer for the TCP/IP protocol widely used on Ethernet networks. In contrast to the OSI seven-layer architecture, TCP/IP (Transmission Control Protocol over Internet Protocol) is a five-layer architecture which generally consists of the network layer and the transport layer protocols.

Layer 4, the transport layer, determines how the network layer should be used to provide a point-to-point, virtual, error-free connection so that the end point devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression, and format and code conversion.

Layer 7, the application layer, is used by the presentation layer to provide the user with a localized representation of data which is independent of the format used on the network. The application layer is generally concerned with the user's view of the network and generally deals with resource allocation, network transparency and problem partitioning.

The communications networks that operate within the OSI seven-layer model include a number of paths or links that are interconnected to route voice, video, and/or digital data (hereinafter, collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user.

This type of network is conventionally referred to as a "circuit-switching network". Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network. The data traffic from the various source nodes is first multiplexed through the source switching facility, then demultiplexed at the destination switching facility, and finally delivered to the proper destination node. A variety of techniques for efficiently multiplexing data from multiple source nodes onto a single circuit of the network are presently employed in private line networks. For instance, time division multiplexing (TDM) affords each source node full access to the allotted bandwidth of the circuit for a small amount of time. The circuit is divided into defined time segments, with each segment corresponding to a specific source node, to provide for the transfer of data from those source nodes, when called upon, through the network.

Other data communications systems, in contrast, have not been as successful with employing multiplexing techniques to further enhance network efficiency. In particular, frame-relay networks offer fewer alternatives than their circuit-switching network counterparts. Frame-relay networks are one implementation of a packet-switching network. Packet-switching networks, as opposed to circuit-switching networks, allow multiple users to share data network facilities and bandwidth, rather than providing a specific amount of dedicated bandwidth to each user, as in TDM. Instead, packet switches divide bandwidth into connectionless, virtual circuits. Virtual circuits can be permanent virtual circuits (PVC's) or switched virtual circuits (SVC's). As is known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit). Frame relay generally operates within layer 2 (the data link layer) of the OSI model, and is an improvement over previous packet switching techniques, such as the industry standard X.25, in that frame relay requires significantly less overhead.

In frame relay networks, as in all communication networks, access to the network is provided by a network service provider. These service providers generally provide the communication and switching facilities over which the above-mentioned communication devices operate. Typically, an end user desirous of establishing a communications network, provisions, or obtains from a network service provider, network services in the form of a public switched service network. An example of a public switched network is the public switched telephone network (PSTN) or a public data network (PDN). These public networks typically sell network services, in the form of connectivity, to end users.

Typically a user of a public network will purchase a particular level of service from the network service provider. This level of service can be measured by, for example, network availability as a percentage of total time on the network, the amount of data actually delivered through the network compared to the amount of data attempted or possibly the network latency, or the amount of time it takes for a particular communication to traverse the network.

One problem with current communication systems is that it is difficult for an end user to adequately determine whether the public network service provider is delivering the quality of service that the end user has contracted, or if the traffic patterns of the end user are responsible for communication difficulties. This is because it is nearly impossible for an end user to adequately determine whether the network is experiencing problems or whether it is the traffic patterns of the end user that may be preventing optimal data transfer over the network.

Therefore, it would be desirable to provide a system and method that will allow an end user of a public network to adequately determine the cause of lost information and/or excessive network latency.

SUMMARY OF THE INVENTION

The present invention provides an improvement to a communication environment, wherein the invention collects and presents to an administrator of a communication network, various performance parameter views of the network. This enables the network administrator to determine whether the communications network is delivering the contracted level of service, or whether the traffic characteristics of the customer data are reducing the level of performance of the network. A graphical user interface and a display system may display a data delivery analysis report, which includes graphical views of various network performance parameters. From this, a network administrator may determine the aforementioned characteristics of the network.

This task may be accomplished by providing, in a communication environment having at least two communications devices and a network management system, a system for collecting and displaying network performance information, comprising a plurality of network performance parameter views, and display means for presenting to a user the plurality of network performance parameter views.

The present invention can also be conceptualized as a method for collecting and displaying network performance parameters in a network comprising a network management system and at least two communication devices, In accordance with one aspect of the invention, the method may comprise the steps of: collecting a plurality of network performance parameter views including a bit burst analysis performance parameter view, a network latency performance parameter view, a data delivery success performance parameter view, and a frame size distribution performance parameter view; and displaying the bit burst analysis, the network latency, the data delivery success, and the frame size distribution performance parameter views.

The invention has numerous advantages, a few of which are delineated hereafter, as merely examples.

An advantage of the invention is that it allows a network management system to present to an administrator of the network a variety of network performance parameters.

Another advantage of the invention is that it allows an administrator of a network the ability to determine whether a communication network is performing at an agreed upon level.

Another advantage of the present invention is that it allows an administrator of a communication network to determine whether customer traffic characteristics are reducing the performance of the network.

Another advantage of the present invention is that it is simple in design, reliable in operation, and its design lends itself to economical mass production in communication devices.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each other, emphasis instead being placed on clearly illustrating the principles of the present invention.

DETAILED DESCRIPTION OF THE INVENTION

The data delivery analysis report logic of the present invention can be implemented in software, hardware, or a combination thereof. In a preferred embodiment, the data delivery analysis report logic is implemented in software that is stored in a memory and that is executed by a suitable microprocessor (uP) situated in a personal computer (PC) or workstation that is part of a communication network management system. However, the data delivery analysis report program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Furthermore, the preferred embodiment of the data delivery analysis report logic is illustrated in the context of a frame relay communications network; however, the concepts and principles of the service quality measurement logic are equally applicable to other communication techniques, such as asynchronous transfer mode (ATM) or X.25.

Figure 1:
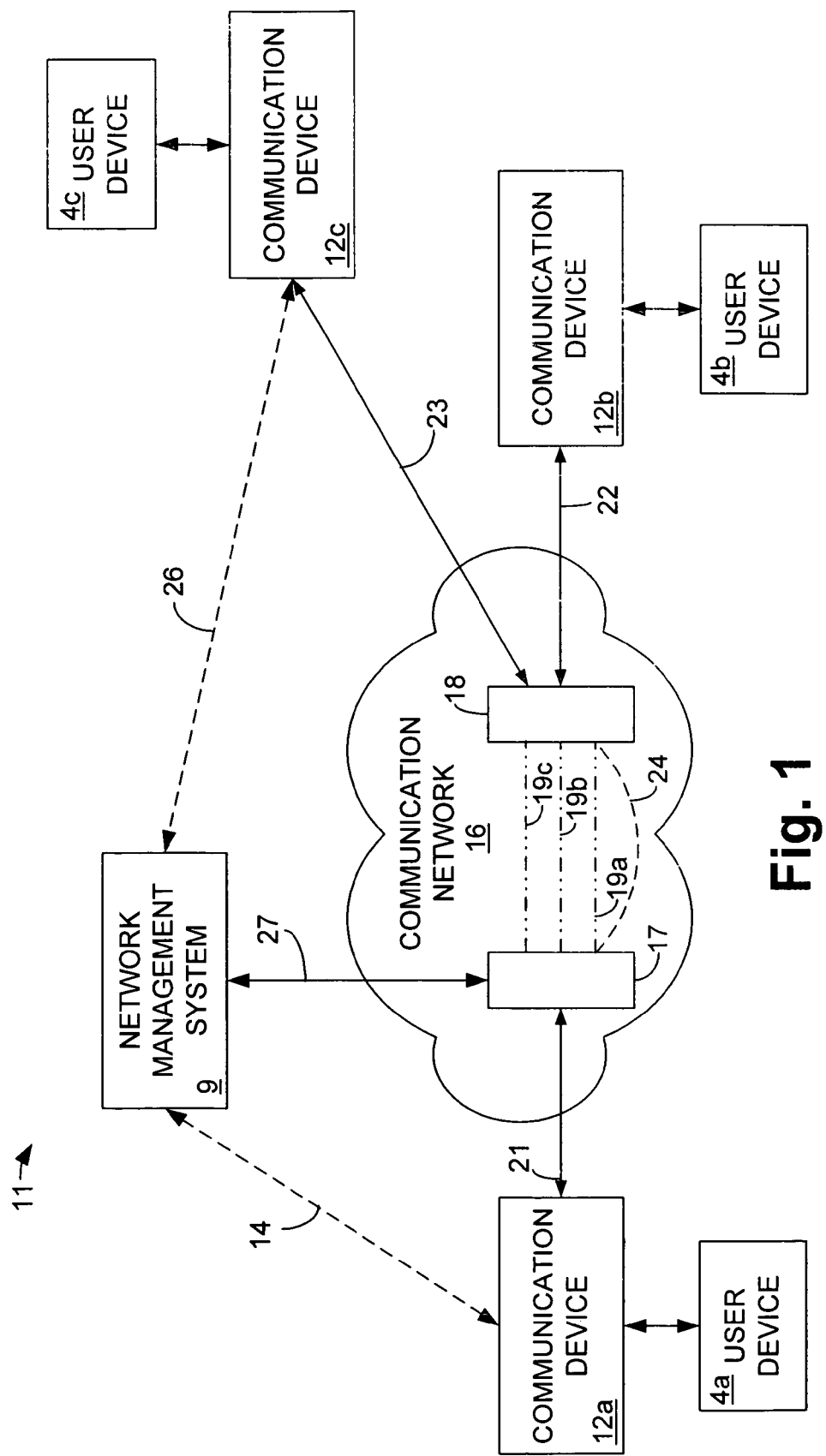
FIG. 1 is a block diagram illustrating a communication environment within which the present invention operates.

FIG. 1 shows a communication environment 11 in which a network management system 9 containing data delivery analysis report logic operates. In general, the communications environment includes a plurality of user devices 4a, 4b, and 4c each connected to a plurality of communication devices 12a, 12b, and 12c respectively. Communication devices 12 may be a wide variety of communication devices, but in a particular aspect of the invention, are frame relay access units (FRAU's). For simplicity, only three FRAU's are depicted in FIG. 1. In practice, communication environment 11 will contain many communication devices. FRAU's 12a, 12b, and 12c are considered communication endpoints and communicate over communication network 16, in a conventional manner. Communication network 16 can be, for example, any network that provides connectivity for FRAU's 12a, 12b, and 12c, and in the preferred embodiment is a frame relay communication network. Communication network 16 illustratively connects to FRAU's 12a, 12b and 12c over connections 21, 22 and 23 respectively. Connections 21, 22 and 23 can be physical links and can be, for example, T1/E1 service or any digital data service (DDS). The network management system 9 communicates with communication network 16 over management connection 27 and collects network performance information from at least two communication devices connected to communication network 16.

Communication network 16 is typically characterized by a mesh network of links (not shown) interconnecting a matrix of intermediate nodes (not shown) through frame relay switches 17 and 18. For simplicity only two frame relay switches are illustrated herein, however, communication network 16 will typically contain many switching devices. The links are typically defined by data link connection identifiers (DLCI's), which are used to identify the logical connection over which the subject data is transported. The use of DLCI's allows multiple logical connections to be multiplexed over the same channel. Alternatively, in the case of an asynchronous transfer mode (ATM) network, virtual path identifiers/virtual channel identifiers (VPI's/VCI's) are used to identify the logical connection over which the subject data is transported.

Information is communicated over the communication network 16 in discrete packets, which may be time multiplexed across shared or common communication links. For example, FRAU 12a may communicate with FRAU 12b over a predefined communication path or link within the frame relay network. This communication path will generally be defined by a number intermediate nodes. The communication link that interconnects FRAU 12a and FRAU 12b may be completely separate and distinct from that which interconnects FRAU 12a and 12c. Alternatively, a segment of the two above-described communication links may be shared. Whether the links are separate or shared is a function of a number of factors, and generally is determined by the service provider.

Within communication network 16 the communication path between FRAU 12a and FRAU 12b, for example, may be the same in both directions. For example, data transmitted from FRAU 12a to FRAU 12b may traverse the same path (i.e., interconnecting, intermediate nodes) as will data transmitted from FRAU 12b to FRAU 12a. This path of intermediate nodes is defined by DLCI's, and is commonly referred to as a permanent virtual circuit (PVC). This name derives from the fact that the circuit is permanent in that it does not change from transmission to transmission. It is, however, virtual in the sense that a unitary physical connection (such as a dedicated leased line) is not established and maintained between the two end points. For example, communication link 21 may be assigned a DLCI of 120 and communication link 23 may be assigned a DLCI of 100, resulting in a PVC between communication devices 12a and 12c DLCI's are assigned to and define all the points in a network through which data passes. For simplicity the data delivery analysis report logic 100 is described herein as applied to permanent virtual circuits (PVC's); however, the data delivery analysis report logic 100 is equally applicable to communication networks employing switched virtual circuits (SVC's).

In accordance with the invention, network management system 9 communicates with at least two FRAU's (in this case FRAU 12a and FRAU 12c) in order to collect information from each FRAU, the information relative to the performance of the communication network 16. For example, information such as transmit burst analysis—the generation of which is disclosed in commonly assigned co-pending U.S. patent application Ser. No. 09/118,106, entitled "SYSTEM AND METHOD FOR CHARACTERIZING BURST INFORMATION", filed on Jul. 17, 1998, and which is hereby incorporated by reference—and information such as network latency and data delivery success—the generation of which is disclosed in commonly assigned co-pending U.S. patent application Ser. No. 09/144,926, entitled "SYSTEM AND METHOD FOR THE MEASUREMENT OF SERVICE QUALITY IN A COMMUNICATION NETWORK", filed on Sep. 1, 1998, and which is hereby incorporated by reference—may be collected by data delivery analysis report logic 100 within network management system 9. Other network performance parameters, such as frame size, may also be collected from FRAU's 12a and 12c by network management system 9. Network management system 9 communicates with FRAU 12a over connection 14 and with FRAU 12c over connection 26. While shown as discrete connections, connections 14 and 26 may also be through communication network 16.

Still referring to FIG. 1, PVC's 19a, 19b, and 19c illustrate the concept of multiple communication paths within communication network 16. An additional multiplexed secondary channel 24 may be included in a frame relay communication path, such as PVC 19a, over which management information can be communicated. Commonly assigned U.S. Pat. No. 5,654,966 entitled "CIRCUIT AND METHOD FOR MULTIPLEXING A FRAME-RELAY VIRTUAL CIRCUIT AND FRAME-RELAY SYSTEM HAVING MULTIPLEXED VIRTUAL CIRCUITS", issued on Aug. 5, 1997, to Lester Jr. et al., describes a secondary channel over which management information can be communicated, and is hereby incorporated by reference.

Figure 2:
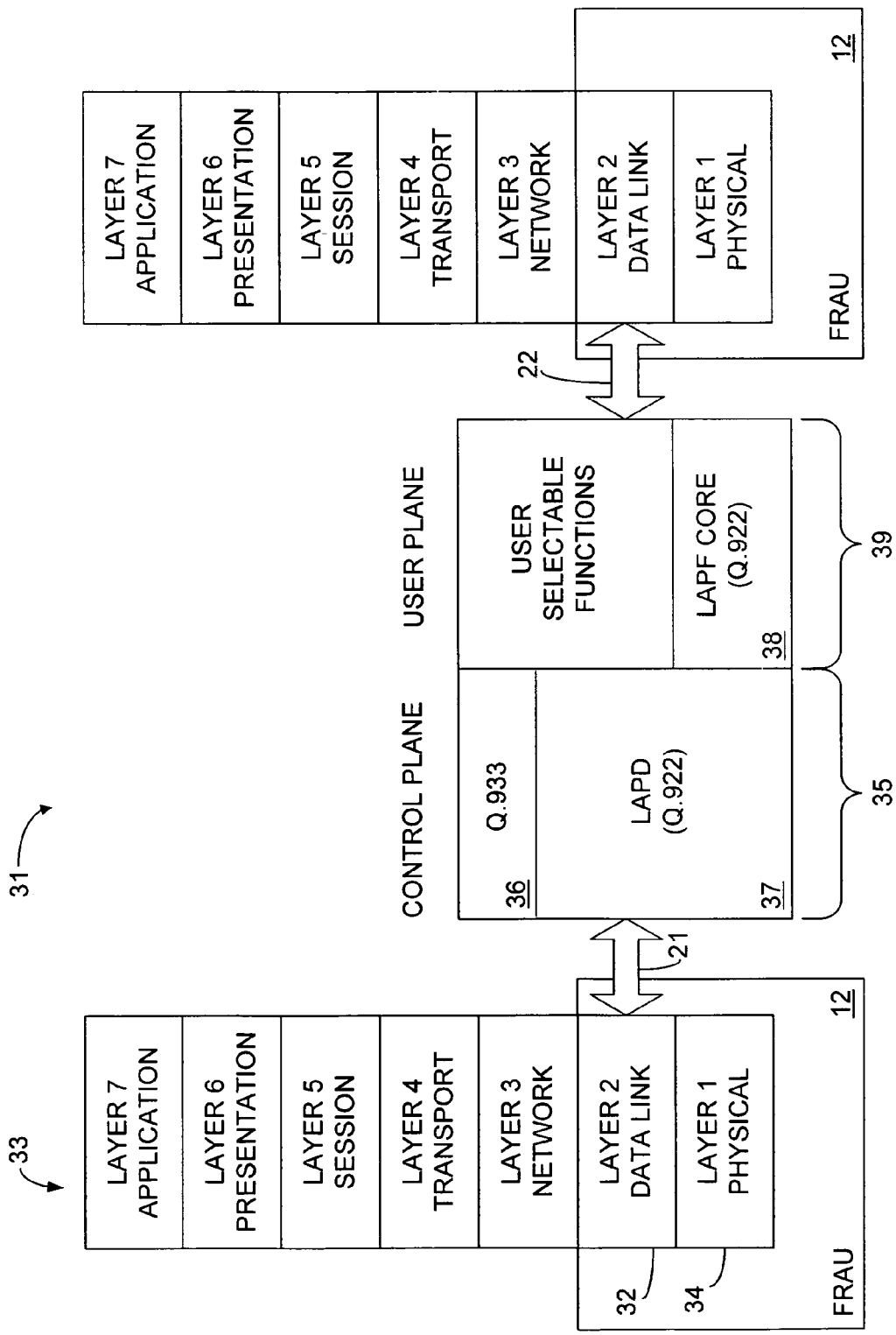
FIG. 2 is a block diagram of a network model illustrating a framework within which the present invention resides.

FIG. 2 shows a block diagram of a network model 31 illustrating the framework within which the present invention resides. The logic of the preferred embodiment of the present invention resides within a network management system that oversees and manages a plurality of FRAU's 12 connected in a communications network. FRAU 12 is typically the device that connects user equipment to a frame relay network. FRAU 12 typically communicates over a frame relay network using Layer 2, or the data link layer 32, of the OSI seven layer model 33. FRAU 12, however, is also aware of layer 1, or the physical layer 34 of the OSI seven layer model, since it contains a physical layer access device, such as a DSU.

Contained at the data link layer 32 are the standards and protocols (including the logical management interface (LMI)) that enable the transport of frame relay data. The protocol architecture that supports frame relay transport can be considered to reside in two planes of operation. The control plane 35 and the user plane 39. The control plane allows signaling to control the establishment and termination of transportation services on the user plane. At the data link layer 32, LAPD (link access protocol, D channel) (Q.922) (ISDN Data Link Layer Specification For Frame Mode Bearer Services) 37 is used to provide a reliable data link control service with error control and flow control. This data link control service is used for the exchange of Q.933 control signaling messages 36. For the transfer of information between end users, the user plane 39 protocol is LAPF (link access procedure for frame mode bearer services) CORE (Q.922 CORE) (Annex A-Core Aspects Of Recommendation Q.922 For Use With Frame Relay Bearer Service) 38. The protocol Q.922, among other things, includes an address header that is applied to a data packet and provides the addressing for the frame relay packet.

The physical layer includes the hardware connections and physical media that enable the transport of information over the network.

Figure 3:
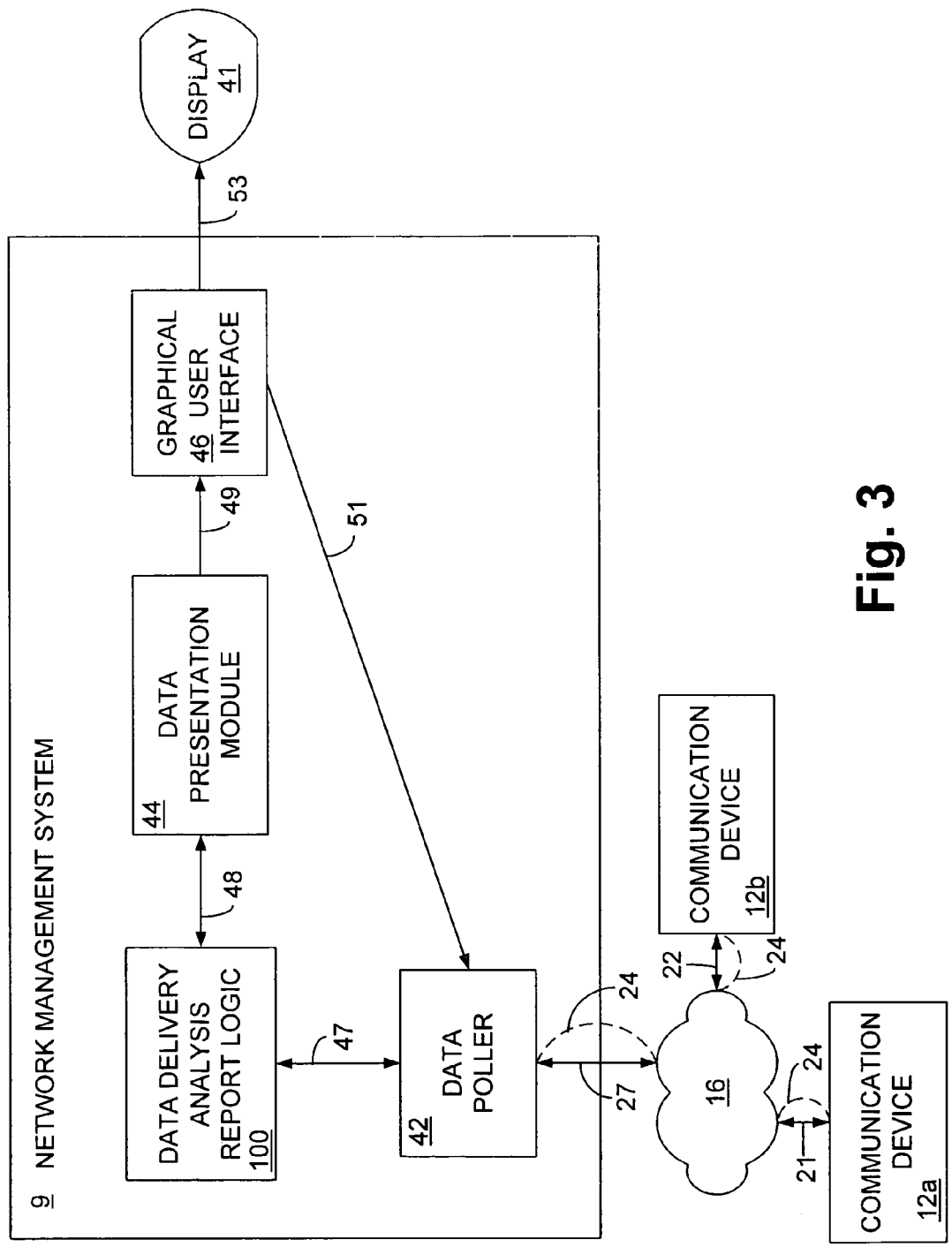
FIG. 3 is a block diagram illustrating a network management system employing a data delivery analysis report logic of the present invention.

Referring now to FIG. 3, shown is a block diagram illustrating a network management system (NMS) 9, containing the data delivery analysis report logic 100 of the present invention. NMS 9 contains a number of elements that allow for the monitoring and management of communication devices 12 that are operating over communication network 16. In accordance with an aspect of the invention, network management system 9 includes data poller 42, which receives information relative to a particular PVC over which at least two communication devices 12a and 12b, for example, are operating. Although shown as connecting to NMS 9 through communication network 16, FRAU's 12a and 12b may connect directly to NMS 9.

Data poller 42 collects information such as, but not limited to, transmit bit burst analysis, round trip network latency, end-to-end data delivery success and transmit frame size distribution relating to FRAU's 12a and 12b. Data poller supplies this information over connection 47 to data delivery analysis report logic 100, which analyzes the individual pieces of information and generates the data delivery analysis report (an example of which is illustrated with respect to FIG. 5).

Data delivery analysis report logic 100 delivers the report over connection 48 to data presentation module 44, which formats the information for presentation. Data presentation module 44 forwards the formatted information over connection 49 to graphical user interface (GUI) 46. GUI 46 prepares the information for presentation to a network administrator over display 41.

GUI 46 also communicates with data poller over connection 51 in order to enable a network administrator to determine and control the rate at which the data poller operates. Specifically, the rate at which the data poller communicates with FRAU's 12a and 12b to collect the above-mentioned information relative to the communication channel (PVC) over which FRAU's 12a and 12b are operating. If desired, the network administrator may also terminate the operation of the data poller 42 by sending the appropriate command from GUI 46 over connection 51.

Communication channels 21, 22 and 27 are typically the physical connection that connects the network management system 9 to communication network 16, through which FRAU's 12 are connected. However, communication channels 21, 22 and 27 can be any medium for connecting the network management system 9 and FRAU's 12 to a communication network. A secondary channel 24 may exist within each data link connection identifier (DLCI), which in turn exist over communication channels 21, 22 and 27.

Figure 5:
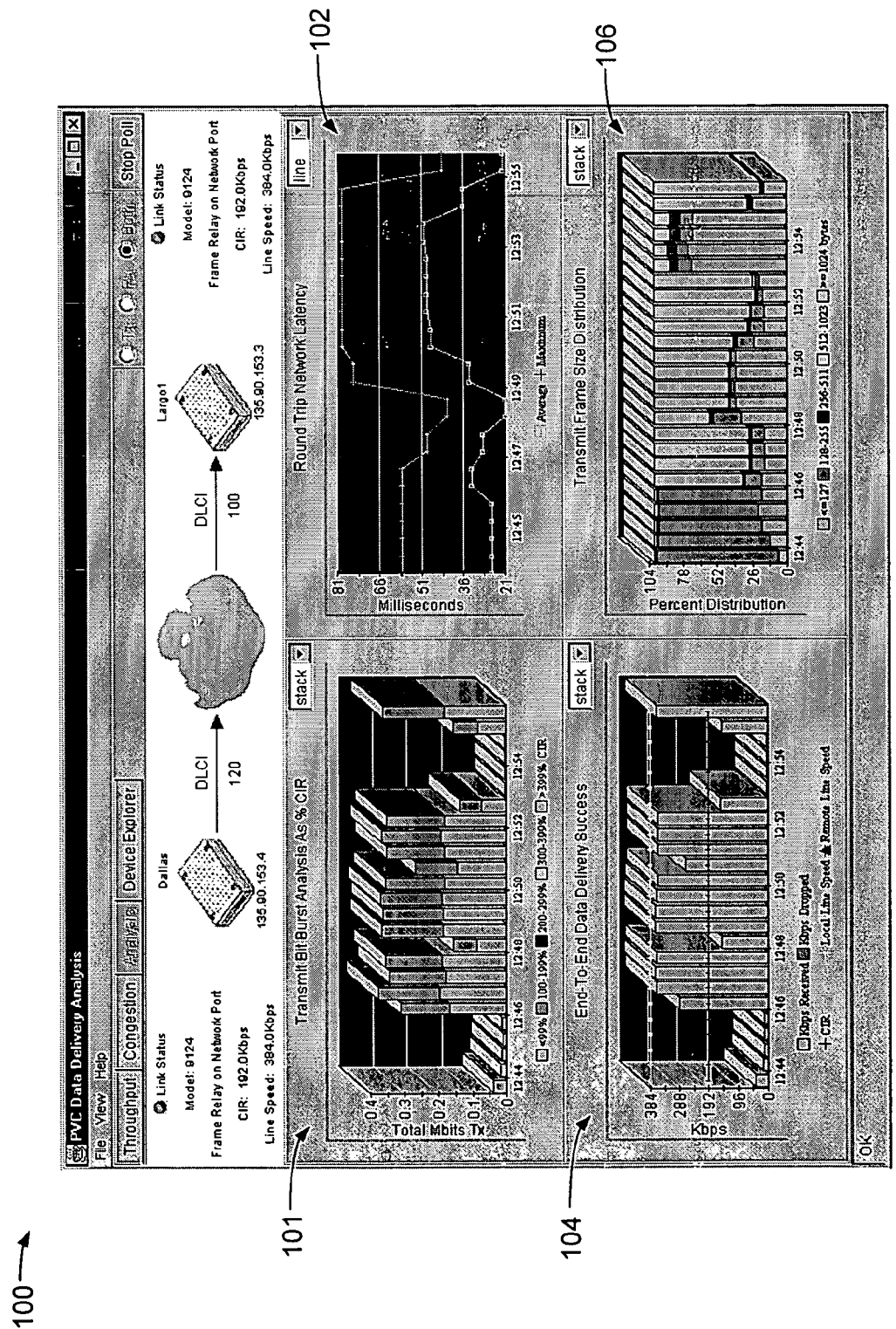
FIG. 5 is a graphical representation of a data delivery analysis report of the present invention.

Secondary channel 24 carries management and control information, which may include information relating to the network performance analysis and display of the present invention. Data delivery analysis logic 100 allows for the collection and display of various network performance parameters relative to at least two FRAU's 12. For example, a network administrator may be operating a network management terminal and request a data delivery analysis report. The data delivery analysis report (a sample of which is depicted in FIG. 5) may be analyzed by the network operator to determine for a particular PVC whether the network is performing as desired, or whether the customer data traffic characteristics are causing reduced network performance. Typically, a network provider will guarantee a certain information rate to an end user. This is sometimes referred to as the committed information rate (CIR). If a customer is experiencing poor network performance it may be useful to be able to determine whether the poor performance is a result of the network or is a result of the customer traffic characteristics. By analyzing the information presented in the data delivery analysis report, a network administrator may be able to make this determination.

For example, if the round trip network latency and end to end data delivery success rates are acceptable, but the end user is still experiencing poor network performance, analyzing the transmit frame size distribution and bit burst analysis may allow the network administrator to determine that the end user traffic characteristics are resulting in the poor network performance. Similarly, if the end user parameters are within acceptable limits and the round trip network latency or the end to end data delivery success are not within a prescribed limits, then it may be an indication of a network problem. The foregoing are merely examples. Any combination of the bit burst analysis, network latency, data delivery success or the frame size distribution may be used to determine whether the network is operating as desired.

Of course, additional information may be obtained and presented in the data analysis report 100 consistent with the concepts and teachings of the present invention.

Also included in NMS 9 is statistics database 48. Statistics database 48 communicates with data delivery analysis report logic 100 in order to store the performance parameter information obtained from FRAU's 12.

Figure 4:
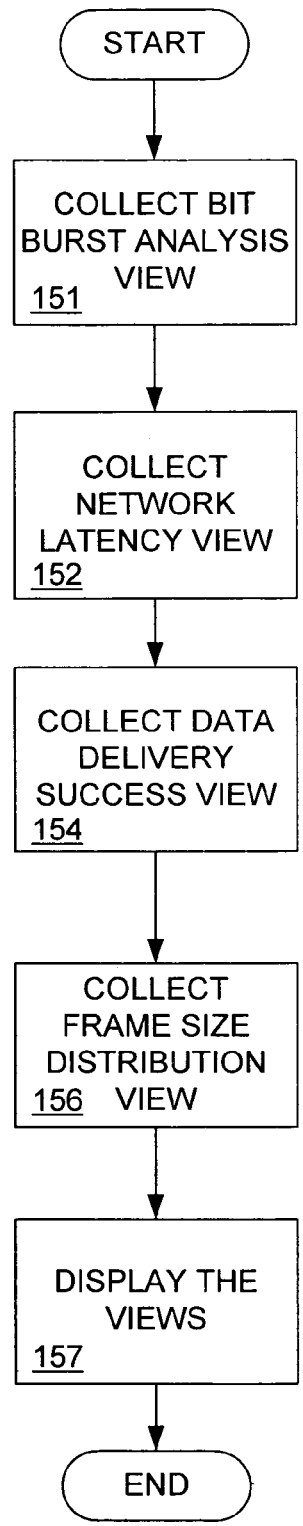
FIG. 4 is a flow diagram illustrating the operation of the data delivery analysis report logic of FIG. 3.

FIG. 4 is a flow diagram 100 illustrating the operation of the data delivery analysis report logic of FIG. 3 as applied to generating a data delivery analysis report.

The flow chart of FIG. 4 shows the architecture, functionality, and operation of a possible implementation of the data delivery analysis report software of FIG. 2. In this regard, each block may represent a module, segment, or portion of code, which comprises one or more executable instructions for implementing the specified logical function (s). It should also be noted that in some alternative implementations, the functions noted in the blocks may occur out of the order noted in FIG. 4. For example, two blocks shown in succession in FIG. 4 may in fact be executed substantially concurrently, the blocks may sometimes be executed in the reverse order, or some of the blocks may not be executed in all instances, depending upon the functionality involved, as will be further clarified hereinbelow.

In block 151, the data delivery analysis logic 100 queries each FRAU 12 in the PVC being considered for its bit burst analysis data, which is placed in database 48 within NMS 9.

In block 152, the data delivery analysis report logic 100 queries each FRAU 12 in the PVC for its network latency information.

Similarly, in blocks 154 and 156, the data delivery analysis report logic 100 queries each FRAU 12 for its data delivery success rate and its frame size distribution information and places that information in database 48.

In block 157, when the aforementioned information is available in database 48, the data delivery analysis report logic 100 in cooperation with graphical user interface 110 generates a graphical representation of the information and presents it to a user over display 41.

FIG. 5 is a graphical representation generated by the data delivery analysis logic 100 of FIGS. 3 and 4. Illustrating one possible manner in representing the information generated by the data delivery analysis report logic, report 100 includes transmit bit burst analysis view 101, round trip network latency view 102, end to end data delivery success view 104, and transmit frame size distribution view 106. By simultaneously presenting these views to a network administrator, various network performance parameters may be analyzed such that network performance may be determined.

Figure 6:
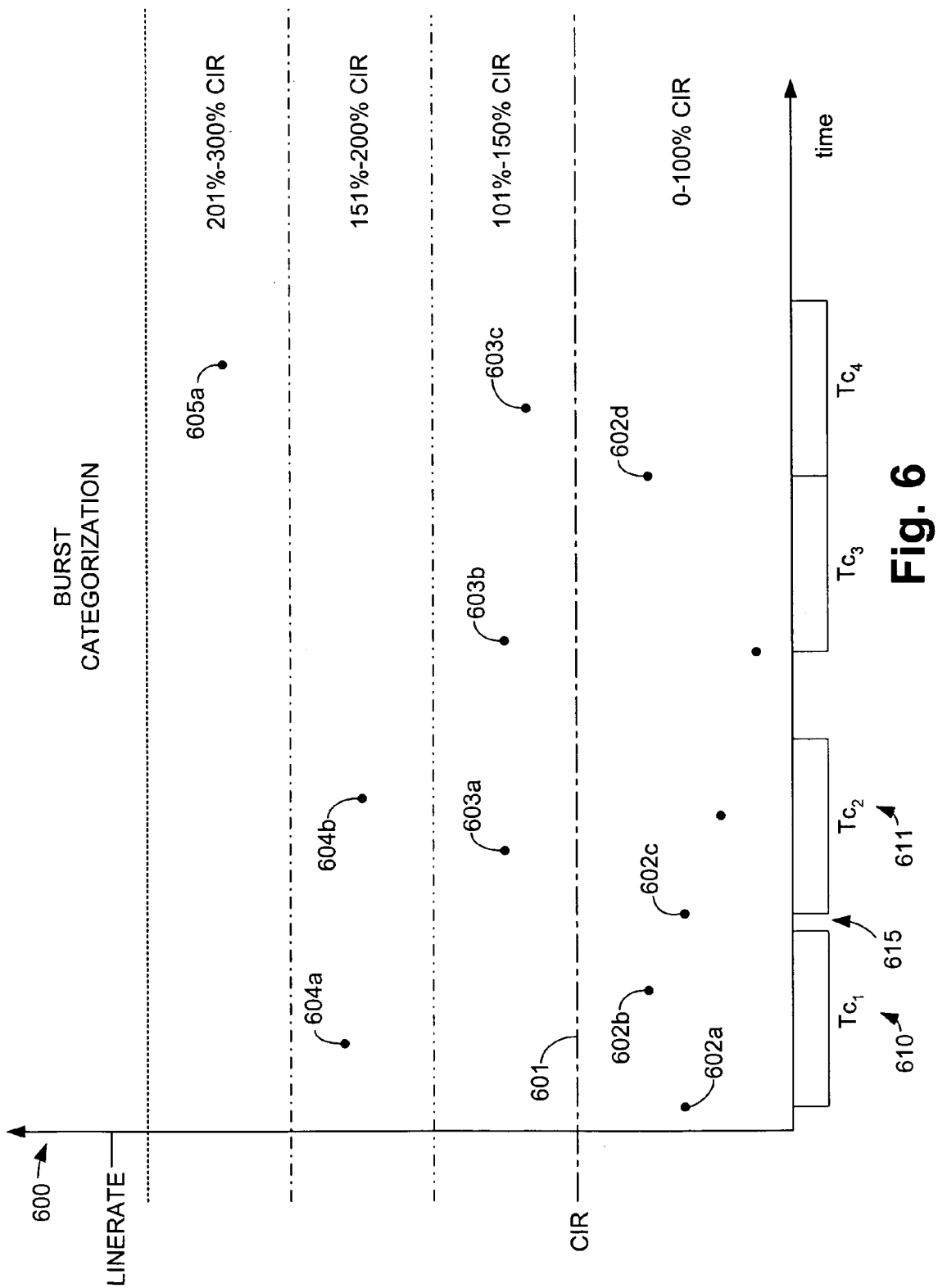
FIG. 6 is a graphical representation of burst categorization in accordance with the present invention.

The bit burst analysis information collected by data poller 42 comprises comprises a plurality of bit burst counters. Data that is nonperiodic, or transmitted at irregular intervals, is considered bursty in nature. Received data on a packet network is typically characterized by the size and extent of bursts occurring above a committed information rate (CIR). The counters used in the present invention will now be explained with reference to FIG. 6.

Depicted on the horizontal axis of graph 600 is time in intervals $T_C$, which may be separated in time if no data is sent. The beginning of a new $T_C$ interval is synchronized to the detection of data. Shown on the vertical axis of graph 600 are the burst characterization categories, or buckets, of the present invention as a function of data rate. $T_C$ (the committed rate measurement interval) is the time interval during which a user is allowed to send $B_C$ (committed amount of data) or $B_C$ (committed amount of data) plus $B_e$ (excess amount of data). $T_C$ is computed from the service parameters of CIR and $B_C$, as $T_C=B_C/CIR$, where CIR is the committed information rate and $B_C$ is the committed amount of data. $T_C$ is not a periodic measurement interval, but rather a sliding window that is triggered by the receipt of user data. Once the $T_C$ interval (i.e., 610, 611, etc. of FIG. 6) has been initiated, it continues until it completes its computed duration. For example, $T_{C1}$ 610 is initiated upon receipt of burst data represented by point 602a. Once $T_{C1}$ elapses another timing interval will only begin upon receipt of another burst transmission. This concept is illustrated by blank space 615 between timing interval $T_{C1}$ and $T_{C2}$. Timing interval $T_{C2}$ is not begun until the receipt of, in this example, data represented by point 602c.

Line 601 illustrates the committed information rate (CIR), which is the rate that the service provider typically guarantees to an end user. The points referenced by numerals 602, 603, 604 and 605 illustratively indicate detected bursts of data traffic detected at 0%–100% CIR, 101%–151% CIR, 151%–200% CIR, and 201%–300% CIR respectively. As can be seen, each burst of data is detected and categorized according to its data rate.

To illustrate the concept of burst data categories consider the following. The region of data rate between zero (0) and the CIR can be considered one category, or bucket. The region of data rate between, for example, the CIR and 150% CIR can be considered another category, or bucket. Similarly, the region between 151% CIR and 200% CIR may be another burst category, and the region of 201% CIR to 300% CIR may yet be another category. These categories are for illustrative purposes only and may be of varying scale. For example, the categories may alternatively be classified as a percentage of line rate, or the categories may be classified based upon raw data numbers.

The bit burst counters collected in the present invention allow the categorization of burst data in a plurality of categories in any given time interval. For example, in time interval $T_{C1}$ 610 (typically, one (1) second) there may be transmitted multiple bursts of data illustrated by points 602a and 602b in one category, and point 604a in another category. The burst data represented by points 602a and 602b were classified as being somewhat less than the CIR while the burst data represented by point 604a is classified as being in the range of 151% CIR to 200% CIR. The counters collected in the present invention discriminate and track bursts of data at different rate categories occurring in a given time interval. Each time a new time interval is begun (e.g., the $T_{C2}$ interval denoted by 611), the data rate is reset to zero and as the data rate crosses a threshold (e.g., as a % of CIR, % of line rate, or a fixed number) the number of bits (or bytes) above the threshold is again counted in the category in which it occurs.

Each time that a burst occurs in a given category, a bit counter increments, thus keeping a count of the number of occurrences of burst data in each category. Each time that a burst is detected, a burst category database is updated.

Because the $T_C$ timer is switched according to the receipt of data, better correlation with frame relay switch statistics can be achieved. For example, the burst information is still captured, however, there is less performance impact on the network management system (NMS), which can read fewer buckets in which the bursts are already categorized.

The aforementioned bursts of data (i.e., 602, 603, etc.) could be identified as bits for higher resolution, or could be identified as bytes to prevent the counters from overflowing. Additionally, a frame count can be kept for each category such that the worst bit category for that frame would cause a frame count to be incremented. This may be desirable because service providers keep information based upon frame counts (as do frame relay switches). Keeping the frame counts allows the correlation of data with the switches inside a network for troubleshooting.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, the principles of the data delivery analysis report detailed herein are similarly applicable to other communication services such as, for example but not limited to ATM.

All such modifications and variations are intended to be included herein within the scope of the present invention, as defined in the claims that follow.

The invention claimed is:

1. In a communication environment having at least a first and a second communication device, said communication devices configured to couple user devices to the network, and a network management system, a system for displaying network performance information, comprising:
   a plurality of network performance parameter views, comprising a bit burst analysis view, a network latency view, a data delivery success view and a frame size distribution view, wherein said views are associated with a virtual circuit between the first and the second communication device; and
   display means for presenting to a user said plurality of network performance parameter views,
   where said bit burst analysis view comprises a plurality of bit burst counters, each of said bit burst counters counting one or more bit bursts that was placed into one of a plurality of burst categories, wherein each of said bit burst counters counts the one or more bit bursts that was placed into one of the plurality of burst categories during a sliding window time interval, the time interval synchronized to begin with detection of the first of the one or more bit bursts.

2. The system of claim 1, wherein said display means further comprises a graphical user interface.

3. The system of claim 1, wherein said display means further comprises a graphical user interface.

4. The system of claim 1, wherein said bit burst analysis, network latency, data delivery success and frame size distribution information is derived from said first and second communication device by a network management system.

5. The system of claim 1, wherein said virtual circuit is a permanent virtual circuit.

6. The system of claim 1, wherein said virtual circuit is a switched virtual circuit.

7. The system of claim 1,
   wherein said plurality of network performance parameter views are collected from said first and said second communication devices.

8. The system of claim 1, wherein said display means presents said bit burst analysis, network latency, data delivery success and frame size distribution views simultaneously.

9. A method for displaying network performance parameters in a network comprising a network management system and at least a first and a second communication device, said communication devices configured to couple user devices to the network, the method comprising the steps of:
   collecting a plurality of network performance information including bit burst analysis information, network latency information, data delivery success information, and frame size distribution information, each of said plurality associated with a virtual circuit between the first and the second communication device; and
   displaying views of said bit burst analysis, said network latency, said data delivery success, and said frame size distribution information,
   where said bit burst analysis information comprises a plurality of bit burst counters, each of said bit burst counters counting one or more bit bursts that was placed into one of a plurality of burst categories, wherein each of said bit burst counters counts the one or more bit bursts that was placed into one of the plurality of burst categories during a sliding window time interval, the time interval synchronized to begin with detection of the first of the one or more bit bursts.

10. The method of claim 9, further comprising the step of:
    collecting in said network management system said plurality of network performance parameter information from said first and said second communication devices.

11. The method of claim 9, further comprising the step of displaying said bit burst analysis, network latency, data delivery success and frame size distribution views simultaneously.

12. The method of claim 9, further comprising:
    collecting the plurality of network performance information from the first communication device over a first secondary management channel and from the second communication device over a second secondary management channel.

13. The method of claim 9, wherein said virtual circuit is a permanent virtual circuit.

14. The method of claim 9, wherein said virtual circuit is a switched virtual circuit.

15. The method of claim 9, wherein said bit burst analysis, network latency, data delivery success and frame size distribution information is derived from said first and second communication device by a network management system.

16. A computer readable medium having a program for displaying network performance parameters in a network comprising a network management system and at least two communication devices, said communication devices configured to couple user devices to the network, the program comprising logic configured to perform the steps of:

collecting a plurality of network performance information including bit burst analysis information, network latency information, data delivery success information, and frame size distribution information, each of said plurality associated with a virtual circuit between the first and the second communication device; and displaying views of said bit burst analysis, said network latency, said data delivery success, and said frame size distribution information, where said bit burst analysis information comprises a plurality of bit burst counters, each of said bit burst counters counting one or more bit bursts that was placed into one of a plurality of burst categories, wherein each of said bit burst counters counts the one or more bit bursts that was placed into one of the plurality of burst categories during a sliding window time interval, the time interval synchronized to begin with detection of the first of the one or more bit bursts.

17. The program of claim 16, further comprising logic configured to perform the step of:

collecting in said network management system said plurality of network performance parameter views from said first and said second communication devices.

18. The program of claim 16, further comprising logic configured to perform the step of displaying said bit burst analysis, network latency, data delivery success and frame size distribution views simultaneously.

19. The computer readable medium of claim 16, further comprising the step of:

collecting the plurality of network performance information from the first communication device over a first secondary management channel and from the second communication device over a second secondary management channel.

20. The computer readable medium of claim 16, wherein said virtual circuit is a permanent virtual circuit.

21. The computer readable medium of claim 16, wherein said virtual circuit is a switched virtual circuit.

22. The computer readable medium of claim 16, wherein said bit burst analysis, network latency, data delivery success and frame size distribution information is derived from said first and second communication device by a network management system.

23. A system for displaying network performance parameters, comprising:

means for collecting, from a first and a second communication device, bit burst analysis information, network latency information, data delivery success information and frame size distribution information associated with a virtual circuit between the first and the second communication device, said first and second communication device each being configured to couple at least one user device to the network; and display means for displaying said bit burst analysis, network latency, data delivery success and frame size distribution information, where said bit burst analysis information comprises a plurality of bit burst counters, each of said bit burst counters counting one or more bit bursts that was placed into one of a plurality of burst categories, wherein each of said bit burst counters counts the one or more bit bursts that was placed into one of the plurality of burst categories during a sliding window time interval, the time interval synchronized to begin with detection of the first of the one or more bit bursts.

24. The system of claim 23, wherein said display means further comprises a graphical user interface.

25. The system of claim 23, wherein said bit burst analysis, network latency, data delivery success and frame size distribution information is derived from said first and second communication device by a network management system.

26. The system of claim 23, wherein said virtual circuit is a permanent virtual circuit.

27. The system of claim 23, wherein said virtual circuit is a switched virtual circuit.

28. The system of claim 23, further comprising:

means for collecting the information from the first communication device over a first secondary management channel and from the second communication device over a second secondary management channel.

29. A system for displaying network performance parameters associated with a first and a second communication device, comprising:

a poller means for polling the first and the second communication device for a plurality of network performance information comprising bit burst analysis information, network latency information, data delivery success information, and frame size distribution information, each of said plurality associated with a virtual circuit between the first and the second communication device, the first and second communication device being configured to couple at least one user device to the network;

an analyzer means for producing a report of the plurality of network performance information; and a display module means for displaying the report, wherein each of said bit burst counters counts the one or more bit bursts that was placed into one of the plurality of burst categories during a sliding window time interval, the time interval synchronized to begin with detection of the first of the one or more bit bursts.

30. The system of claim 29, wherein the poller is further configured to poll the first communication device over a first secondary management channel and to poll the second communication device over a second secondary management channel.

31. The system of claim 29, further comprising:

a statistics database configured to store the plurality of network performance information.

32. The system of claim 29, further comprising:

a formatter configured to prepare the report for visual presentation.

33. The system of claim 29, further comprising:

means for setting the rate at which the poller operates.

34. The system of claim 29, wherein said virtual circuit is a permanent virtual circuit.

35. The system of claim 29, wherein said virtual circuit is a switched virtual circuit.

36. The system of claim 29, wherein said display module means displays said bit burst analysis, network latency, data delivery success and frame size distribution information simultaneously.

* * * * *